US006769231B2

(12) United States Patent
Danby

(10) Patent No.: US 6,769,231 B2
(45) Date of Patent: Aug. 3, 2004

(54) APPARATUS, METHOD AND FLEXIBLE BAG FOR USE IN MANUFACTURING

(75) Inventor: Hal C. Danby, Suffolk (GB)

(73) Assignee: Baxter International, Inc., Deerfield, IL (US)

(*) Notice: Subject to any disclaimer, the term of this patent is extended or adjusted under 35 U.S.C. 154(b) by 58 days.

(21) Appl. No.: 09/909,422

(22) Filed: Jul. 19, 2001

(65) Prior Publication Data

US 2003/0014945 A1 Jan. 23, 2003

(51) Int. Cl.[7] .................................................. B65B 1/04
(52) U.S. Cl. ........................... 53/473; 53/559; 222/105; 222/207; 222/478; 222/479
(58) Field of Search .................. 53/453, 559; 141/129, 141/238; 222/95, 105, 207, 212, 214, 479, 478, 107

(56) References Cited

U.S. PATENT DOCUMENTS

| 2,791,324 | A | | 5/1957 | Knoop et al. |
| 2,872,081 | A | | 2/1959 | Randall |
| 3,007,416 | A | | 11/1961 | Childs |
| 3,257,072 | A | | 6/1966 | Reynolds |
| 3,343,719 | A | | 9/1967 | Kastamo et al. |
| 3,435,990 | A | | 4/1969 | Pike, Jr. |
| 3,456,647 | A | * | 7/1969 | Wada .......................... 604/405 |
| 3,656,873 | A | | 4/1972 | Schiff |
| 3,677,444 | A | | 8/1972 | Merrill |
| 3,689,204 | A | | 9/1972 | Prisk |
| 3,790,029 | A | * | 2/1974 | Ward ......................... 222/129.4 |
| 3,808,772 | A | | 5/1974 | Turtschan |
| 3,814,547 | A | | 6/1974 | Kitrilakis et al. |
| 3,878,992 | A | | 4/1975 | MacManus |
| 3,955,901 | A | | 5/1976 | Hamilton |
| 4,025,739 | A | | 5/1977 | Kull |
| 4,047,844 | A | | 9/1977 | Robinson |
| 4,086,653 | A | | 4/1978 | Gernes |
| 4,158,530 | A | | 6/1979 | Bernstein |

(List continued on next page.)

FOREIGN PATENT DOCUMENTS

| EP | 0 033 096 | | 8/1981 | |
| EP | 0 482 721 B1 | | 9/1995 | |
| FR | 1386519 A | | 1/1965 | |
| GB | 1 547 025 | | 6/1979 | |
| GB | 2 098 963 A | | 5/1981 | |
| GB | 2 098 963 | * | 12/1982 | ........... G07F/13/00 |
| WO | WO 81/02002 A1 | | 7/1981 | |
| WO | WO 95/25459 A1 | | 9/1995 | |
| WO | WO 97/33809 A1 | | 9/1997 | |
| WO | WO 03/038770 A2 | | 5/2003 | |

OTHER PUBLICATIONS

International Search Report for PCT/US 02/18631 dated Jul. 10, 2002.
International Search Report for PCT/US 02/27984 dated Dec. 13, 2002.
International Search Report for PCT/US 03/16020 dated Sep. 19, 2003.

Primary Examiner—Rinaldi I. Rada
Assistant Examiner—Gloria R Weeks
(74) Attorney, Agent, or Firm—Senniger, Powers, Leavitt & Roedel

(57) ABSTRACT

A method for manufacturing in which a fluent material is dispensed to an article such as a container from a flexible bag The fluent material is dispensed directly to the container without any intervening structure which contacts the fluent material. Accordingly, the apparatus can be constructed of less expensive materials and does not require frequent cleaning. The apparatus acts on the bag to dispense and does not act on the fluent material. Thus, the apparatus has particular application where aseptic conditions need to be maintained such as in the packaging of the food and medicine The flexible bag is preferably formed with multiple outlets permitting simultaneous dispensing to multiple containers.

29 Claims, 7 Drawing Sheets

U.S. PATENT DOCUMENTS

| | | | |
|---|---|---|---|
| 4,167,235 A | * 9/1979 | Green | 222/105 |
| 4,174,872 A | 11/1979 | Fessler | |
| 4,181,245 A | 1/1980 | Garrett et al. | |
| 4,220,259 A | 9/1980 | Lagneaux | |
| 4,237,881 A | 12/1980 | Beigler et al. | |
| 4,265,601 A | 5/1981 | Mandroian | |
| 4,273,121 A | 6/1981 | Jassawalla | |
| 4,303,376 A | 12/1981 | Siekmann | |
| 4,334,640 A | 6/1982 | van Overbruggen et al. | |
| 4,348,280 A | 9/1982 | George et al. | |
| 4,375,346 A | 3/1983 | Kraus et al. | |
| 4,389,436 A | 6/1983 | Weiner | |
| 4,421,506 A | 12/1983 | Danby et al. | |
| 4,430,048 A | 2/1984 | Fritsch | |
| 4,477,054 A | 10/1984 | Danby et al. | |
| 4,479,760 A | 10/1984 | Bilstad et al. | |
| 4,482,299 A | 11/1984 | Eulass | |
| 4,513,885 A | 4/1985 | Hogan | |
| 4,515,589 A | 5/1985 | Austin et al. | |
| 4,537,387 A | 8/1985 | Danby et al. | |
| 4,548,023 A | 10/1985 | Danby et al. | |
| 4,552,552 A | 11/1985 | Polaschegg et al. | |
| 283,225 A | 4/1986 | Canvasser | |
| D283,225 S | 4/1986 | Canvasser | |
| 4,618,399 A | 10/1986 | Li | |
| 4,624,663 A | 11/1986 | Danby et al. | |
| 4,634,430 A | 1/1987 | Polaschegg | |
| 4,624,098 A | 2/1987 | Lundquist | |
| 4,648,810 A | 3/1987 | Schippers et al. | |
| 4,651,862 A | 3/1987 | Greenfield, Jr. | |
| 4,686,125 A | 8/1987 | Johnston et al. | |
| 4,708,266 A | 11/1987 | Rudick | |
| 4,717,047 A | * 1/1988 | van Overbruggen et al. | 222/207 |
| 4,717,117 A | 1/1988 | Cook | |
| 4,718,778 A | 1/1988 | Ichikawa | |
| 4,741,461 A | 5/1988 | Williamson et al. | |
| 4,753,370 A | 6/1988 | Rudick | |
| 4,765,512 A | 8/1988 | Bull, Jr. | |
| 4,768,547 A | 9/1988 | Danby et al. | |
| 4,778,451 A | 10/1988 | Kamen | |
| 4,808,161 A | 2/1989 | Kamen | |
| 4,808,346 A | 2/1989 | Strenger | |
| 4,816,019 A | 3/1989 | Kamen | |
| 4,818,186 A | 4/1989 | Pastrone et al. | |
| 4,826,482 A | 5/1989 | Kamen | |
| 4,828,545 A | 5/1989 | Epstein et al. | |
| 4,830,586 A | 5/1989 | Herter et al. | |
| 4,848,722 A | 7/1989 | Webster | |
| 4,857,055 A | 8/1989 | Wang | |
| 4,860,923 A | 8/1989 | Kirschner et al. | |
| 4,872,813 A | 10/1989 | Gorton et al. | |
| 4,886,432 A | 12/1989 | Kimberlin | |
| 4,898,303 A | 2/1990 | Large et al. | |
| 4,918,907 A | 4/1990 | Roach et al. | |
| 4,942,735 A | 7/1990 | Mushika et al. | |
| 4,976,162 A | 12/1990 | Kamen | |
| 4,983,102 A | 1/1991 | Swain | |
| 4,997,661 A | 3/1991 | Kromer et al. | |
| 5,000,351 A | 3/1991 | Rudick | |
| 5,002,471 A | 3/1991 | Perlov | |
| 5,006,050 A | 4/1991 | Cooke et al. | |
| 5,033,651 A | 7/1991 | Whigham et al. | |
| 5,080,652 A | 1/1992 | Sancoff et al. | |
| 5,082,143 A | 1/1992 | Schramm, Jr. | |
| 5,088,515 A | 2/1992 | Kamen | |
| 5,090,963 A | 2/1992 | Gross et al. | |
| 5,105,983 A | 4/1992 | Sancoff et al. | |
| 5,135,485 A | 8/1992 | Cohen et al. | |
| 5,151,019 A | 9/1992 | Danby et al. | |
| 5,193,990 A | 3/1993 | Kamen et al. | |
| 5,199,852 A | 4/1993 | Danby | |
| D338,891 S | 8/1993 | Folk | |
| 5,242,083 A | 9/1993 | Christine et al. | |
| 5,249,706 A | 10/1993 | Szabo | |
| 5,265,518 A | 11/1993 | Reese et al. | |
| 5,284,481 A | 2/1994 | Soika et al. | |
| 5,302,088 A | 4/1994 | Gronski et al. | |
| 5,306,257 A | 4/1994 | Zdeb | |
| 5,332,372 A | 6/1994 | Reynolds | |
| 5,341,957 A | 8/1994 | Sizemore | |
| 5,344,292 A | 9/1994 | Rabenau et al. | |
| 5,350,357 A | 9/1994 | Kamen et al. | |
| 5,356,039 A | 10/1994 | Christine et al. | |
| 5,369,999 A | 12/1994 | Yoshida | |
| 5,385,540 A | 1/1995 | Abbott et al. | |
| 5,409,355 A | 4/1995 | Brooke | |
| RE33,943 E | 6/1995 | Arzberger et al. | |
| 5,429,485 A | 7/1995 | Dodge | |
| 5,458,468 A | 10/1995 | Ye et al. | |
| 5,465,619 A | 11/1995 | Sotack et al. | |
| 5,476,368 A | 12/1995 | Rabenau et al. | |
| 5,487,649 A | 1/1996 | Dorsey, III et al. | |
| 5,542,919 A | 8/1996 | Simon et al. | |
| 5,584,811 A | 12/1996 | Ross et al. | |
| 5,593,290 A | 1/1997 | Greisch et al. | |
| 5,597,093 A | 1/1997 | Lee | |
| 5,609,572 A | 3/1997 | Lang | |
| 5,613,835 A | 3/1997 | Tyner | |
| 5,620,420 A | 4/1997 | Kriesel | |
| 5,649,910 A | 7/1997 | Kriesel et al. | |
| 5,656,032 A | 8/1997 | Kriesel et al. | |
| 5,656,033 A | 8/1997 | Atkinson | |
| 5,660,477 A | 8/1997 | Ichikawa | |
| 5,669,764 A | 9/1997 | Behringer et al. | |
| 5,673,820 A | 10/1997 | Green et al. | |
| 5,682,726 A | 11/1997 | Green et al. | |
| 5,693,018 A | 12/1997 | Kriesel et al. | |
| 5,693,019 A | 12/1997 | Kriesel | |
| 5,697,525 A | 12/1997 | O'Reilly et al. | |
| 5,700,245 A | 12/1997 | Sancoff et al. | |
| 5,716,343 A | 2/1998 | Kriesel et al. | |
| 5,720,728 A | 2/1998 | Ford | |
| 5,722,957 A | 3/1998 | Steinbach | |
| 5,728,086 A | 3/1998 | Niedospial, Jr. | |
| 5,730,165 A | 3/1998 | Philipp | |
| 5,735,818 A | 4/1998 | Kriesel et al. | |
| 5,749,854 A | 5/1998 | Shen | |
| 5,766,150 A | 6/1998 | Langkau | |
| 5,785,688 A | 7/1998 | Joshi et al. | |
| 5,816,779 A | 10/1998 | Lawless et al. | |
| 5,836,482 A | * 11/1998 | Ophardt et al. | 222/325 |
| 5,836,908 A | 11/1998 | Beden et al. | |
| 5,842,841 A | 12/1998 | Danby et al. | |
| 5,857,951 A | 1/1999 | Ichikawa | |
| 5,921,951 A | 7/1999 | Morris | |
| 5,938,634 A | 8/1999 | Packard | |
| 5,964,583 A | 10/1999 | Danby | |
| 6,003,733 A | 12/1999 | Wheeler | |
| 6,024,252 A | 2/2000 | Clyde | |
| 6,036,056 A | 3/2000 | Lee et al. | |
| 6,062,425 A | 5/2000 | Brown et al. | |
| 6,092,695 A | * 7/2000 | Loeffler | 222/207 |
| 6,096,358 A | 8/2000 | Murdick et al. | |
| 6,098,524 A | 8/2000 | Reese | |
| 6,116,460 A | 9/2000 | Kim et al. | |
| 6,126,403 A | 10/2000 | Yamada | |
| 6,139,531 A | 10/2000 | Danby | |
| 6,158,484 A | 12/2000 | Greenlee | |
| 6,165,154 A | 12/2000 | Gray et al. | |
| 6,167,683 B1 | 1/2001 | Wong | |

| | | |
|---|---|---|
| 6,173,862 B1 | 1/2001 | Buca et al. |
| 6,186,361 B1 | 2/2001 | Teetsel, III |
| 6,189,736 B1 | 2/2001 | Phallen et al. |
| 6,213,738 B1 | 4/2001 | Danby et al. |
| 6,250,506 B1 | 6/2001 | Geiger et al. |
| 6,253,968 B1 * | 7/2001 | Van Dijk et al. ............ 222/241 |
| 6,257,844 B1 | 7/2001 | Stern |
| 6,296,450 B1 | 10/2001 | Westberg et al. |
| 6,332,564 B2 | 12/2001 | Ichikawa |
| 6,345,734 B2 | 2/2002 | Schalow et al. |
| 6,382,470 B1 | 5/2002 | Hu et al. |
| 6,398,760 B1 | 6/2002 | Danby |
| 6,416,293 B1 | 7/2002 | Bouchard et al. |
| 6,419,121 B1 | 7/2002 | Gutierrez et al. |
| 6,505,758 B2 | 1/2003 | Black et al. |
| 6,516,997 B1 | 2/2003 | Tanazawa et al. |
| 6,527,518 B2 | 3/2003 | Ostrowski |
| 6,536,188 B1 * | 3/2003 | Taggart ...................... 53/425 |

* cited by examiner

US 6,769,231 B2

APPARATUS, METHOD AND FLEXIBLE BAG FOR USE IN MANUFACTURING

BACKGROUND OF THE INVENTION

This invention relates generally to manufacturing processes and equipment, and more particularly to manufacturing of products employing a flexible bag for dispensing a fluent material to articles.

Many manufacturing processes and apparatus have as a component element the dispensing of a fluent material to an article. As one example, packaging machinery which fills a container and seals or closes the container is widely employed to package a variety of products. For certain applications, the same machines also make the container. So called form, fill and seal machines typically form a bag from a web of flexible material and pass the bag directly to a filling station where the product is fed by gravity otherwise moved into the bag through an opening in the bag. The same machine then seals the bag opening to enclose the product. The bag may also be itself placed inside another container such as a cardboard box.

Food and medicinal products are commonly packaged in the way and by the type of machine described above. These products are of the type which can flow under the force of gravity, or when pushed by a pump, auger or other suitable device. Of course, liquid materials can be packaged in this manner, but often the product is a solid (e.g., potato chips, cereal or pills) which is sufficiently granular to flow. Naturally, food and medicinal products must be handled by the machine in such a way as to maintain aseptic conditions. Accordingly, the parts of the machine which handle the food are made of materials (e.g., stainless steel) which are highly resistant to corrosion and can be cleaned. However, such materials are expensive and significantly increase the cost of the machine. The machines must be periodically shut down to clean surfaces which handle the food product and the bags. Many food products are prone to leave crumbs, residue or other debris as they are handled, which cause the machinery to become unsanitary. Although necessary, it is inefficient to stop the machine frequently for cleaning and this increases the cost of packaging the product.

SUMMARY OF THE INVENTION

Among the several objects and features of the present invention may be noted the provision of apparatus and method for dispensing a fluent material to an article; the provision of such an apparatus and method which handle fluent materials while keeping the apparatus clean; the provision of such an apparatus and method which are capable of maintaining aseptic conditions; the provision of such an apparatus and method which do not require frequent stoppage for cleaning; the provision of such an apparatus and method which are effective in mass production; the provision of such an apparatus and method which can operate rapidly; and the provision of such an apparatus and method which are economical and easy to use.

Further among the several objects and features of the present invention may be noted the provision of a flexible bag used to dispense a fluent material which is capable of dispensing at multiple outlets; the provision of such a bag which can be manipulated to dispense directly onto an article from the bag within any intervening structure; the provision of such a bag which can store and deliver a product in an aseptic condition; and the provision of such a bag which is economical to use in manufacture.

Generally, a method of automatically filling containers with a fluent material for mass production of filled receiving members comprises providing an array of receiving members adapted to receive fluent material. A charge of fluent material is metered from a flexible bag to plural ones of the receiving members at the same time.

In another aspect of the invention, a method of dispensing a fluent material to articles which receive the fluent material in a manufacturing operation generally comprises selectively dispensing fluent material to plural ones of the articles at the same time by deforming a flexible reservoir to eject fluent material therefrom. The flexible reservoir is replaced with another flexible reservoir upon substantial depletion of fluent material from the reservoir as a result of the dispensing step, for continued dispensing of the fluent material.

In still another aspect of the present invention, apparatus for manufacturing fluent material receiving members having a fluent material applied thereto generally comprises a flexible bag containing the fluent material and having outlets therein from which fluent material may be dispensed. Means adapted to receive portions of the bag is capable of metering a charge of fluent material from the bag to plural ones of the receiving members at the same time.

In a further aspect of the present invention, apparatus for manufacturing articles having a fluent material applied thereto from a flexible bag containing the fluent material generally comprises a support adapted to releasably hold the flexible bag containing fluent material in position for dispensing to the articles. A conveyor moves the articles past the support for receiving fluent material from the flexible bag. A flow control adapted to receive at least a portion of the flexible bag is capable of deforming the bag to produce flow of fluent material out of the bag to the articles.

In a still further aspect of the present invention, apparatus for manufacturing articles having a fluent material applied thereto generally comprises a flexible bag containing the fluent material and adapted to dispense fluent material to multiple ones of the articles at the same time. A support is adapted to releasably hold the flexible bag containing fluent material in position for dispensing to the articles. A flow control adapted to receive multiple portions of the flexible bag is capable of deforming the bag to produce flow of fluent material out of the bag to plural ones of the articles at the same time.

Other objects and features of the present invention will be in part apparent and in part pointed out hereinafter.

BRIEF DESCRIPTION OF THE DRAWINGS

Corresponding reference characters indicate corresponding parts throughout the several views of the drawings.

DETAILED DESCRIPTION OF THE PREFERRED EMBODIMENTS

Figure 1:
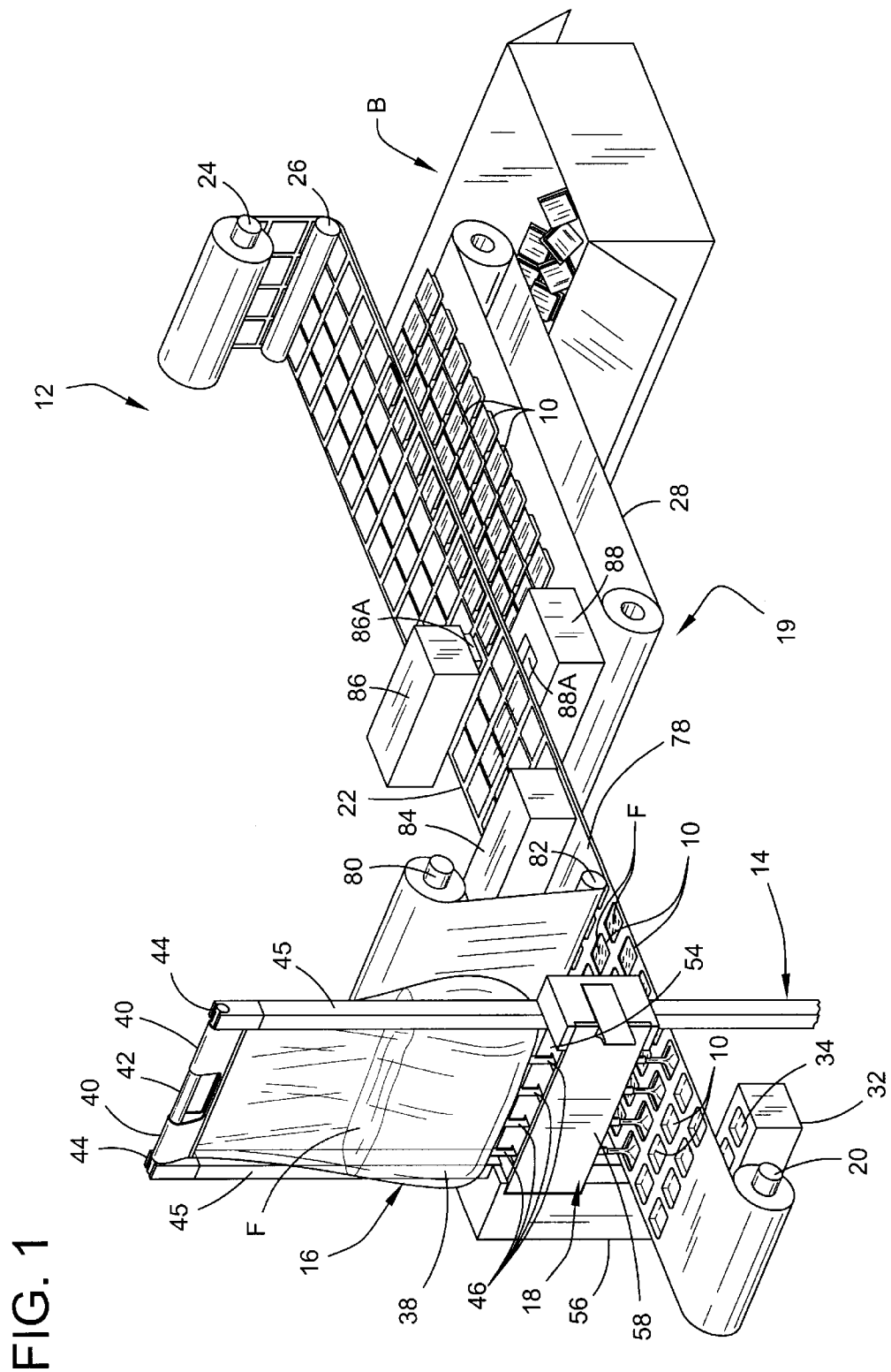
FIG. 1 is a schematic perspective view of apparatus for automatically filling containers of the present invention.

Referring now to the drawings and in particular to FIG. 1, apparatus of the present invention for forming containers 10, filling the containers with a fluent material F and sealing the containers is indicated generally at 12. The apparatus includes a support 14 which suspends a flexible bag (or "reservoir") 16 holding the fluent material F, and mounts a pump 18 (the reference numerals designating their subjects generally). The fluent material F may be a food or medicinal product, but is not limited to materials consumed or otherwise used on or in the body. Moreover, the material may be of such a nature that it is fluent only at the time it is delivered from the bag 16. The present invention is particularly adapted for use to maintain an aseptic environment for the fluent material F, but has application where it is not necessary that such an environment be maintained. Although the substance is preferably a liquid or semi-liquid, solids which are sufficiently granular to flow may also be held in the flexible bag 16. As one example of the type of product packaged, the fluent material F could be honey to be packaged in small, disposable containers 10 such as for single serving use by customers of a restaurant.

A conveyor of the apparatus 12 is generally indicated at 19 and includes in the illustrated embodiment a first feed roller 20 holding a roll of material to form containers 10 extending forward from the first feed roller in a web 22, and a take-up roller 24 which receives a remnant of the web. A first guide roller 26 is provided to locate the web 22 in a horizontal position while permitting the web to change direction to reach the take-up roller 24. A belt conveyor 28 located under the web 22 at the downstream end of the web receives sealed containers 10 which are separated from the web, and conveys them for tumble packaging in a box B. It is to be understood that the illustration of the conveyor 19 is schematic as the details of construction are well known to those of ordinary skill in the art in the field of such apparatus. Moreover, although the conveyor 19 is illustrated to include rollers 20, 24 which let out and take up the web 22 of material from which the containers 10 are formed, other conveyors are envisioned. For instance, a belt or other moving surface or support (not shown) which receives pre-formed containers could be used without departing from the scope of the present invention. In that instance, the first feed roller 20 and belt conveyor 28 would not be present.

Further, it is envisioned that a conveyor for establishing relative motion between the containers 10 and the flexible bag 16 could include not only the conveyor 19, but also structure for moving the bag while the containers are stationary, or structure which produces some combination of movement of the bag and movement of the containers. In any event if the bag 16 is the frame of reference, the containers 10 will move past the bag. Still further, it is not necessary that the fluent material F be used to fill containers of any type. Indeed the fluent material can be applied to the exterior of an article (or "receiving member"), such as the application of icing to a manufactured food product, which does not "contain" the fluent material. The fluent material could also be injected into the article.

In the illustrated embodiment, containers 10 are formed from the web 22 by a die 32 and a form (not shown) which come together just upstream from the first feed roller 20 to deform the web into rectangular, flat-bottomed depressions constituting the containers. The die 32 contains recesses 34 having shapes substantially the same as that of the containers 10 to be formed. The form, which would be located above the web 22, has not been shown so as not to obstruct the view of the flexible bag 16. The shape of the end of the form is the reverse of the recess so that the form may fit into the recess, forming the web 22 between them. The form and die 32 create one laterally extending row of containers 10 from the web 22 on a single stroke. In the illustrated embodiment, the rows constitute an array of containers 10. However as used herein, an array can refer to a single file line of containers or only a single container placed under the bag 16 for filling. As shown, the containers 10 are formed by stretching the web 22 without substantially affecting the lateral dimension or shape of the web. However, some dimensional variation can be tolerated if the containers 10 retain their relative arrangement. Once formed, the containers 10 retain their shape, but remain part of the web 22 and move with the web.

The web 22 passes forwardly from the form and die 32 under the flexible bag 16 held by the support 14. The bag 16 is made of a flexible material (which as used herein would include a limp material), which can be formed in a sterile environment or formed and filled in a non-sterile environment and then subject to a sterilizing process. However as mentioned above, the bag 16 could also be used for products not requiring a aseptic conditions. Any suitable material could be used to form the bag 16, such as an appropriate polymer, including without limitation polyvinyl chloride, polyolefin, polymer laminates and polymer alloys. As shown, the bag 16 is transparent so that the flowable product carried by the bag can be readily seen to determine if the bag is empty. However, other ways (not illustrated) of establishing whether the bag 16 is nearing empty can be employed, such as electronic eyes which view the level of fluent material F, and devices to weigh the bag.

Figure 3:
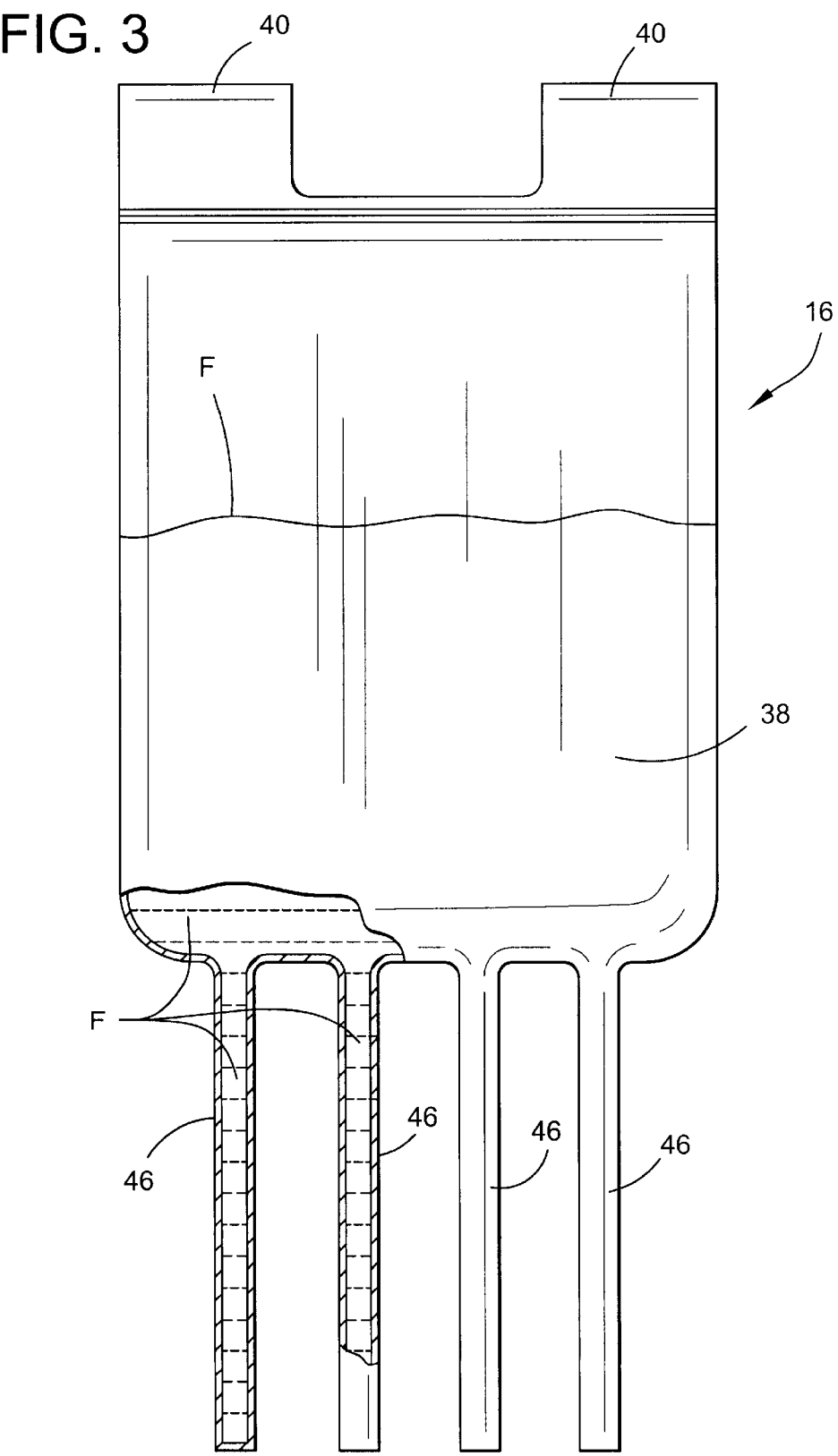
FIG. 3 is an elevation of a flexible bag with parts broken away to show the integral connection of nipples to the bag.

Referring to FIG. 3, the bag 16 comprises a thin-walled body 38 which encloses a volume containing the large majority of the fluent material F. At the upper end of the body 38, two laterally elongate loops 40, together constituting in the illustrated embodiment "a hanger", are formed as one piece with the remainder of the bag 16. The loops 40 can be also formed separately from the bag 16 and attached to the body 38 in a suitable manner such as by welding, adhesive or with a mechanical fastener(s). The loops 40 receive a mounting rod 42 of the support 14 which extends laterally of the bag and holds the bag on the support. The ends of the rod 42 are received in upwardly opening, U-shaped receptacles 44 at the upper ends of uprights 45 of the support 14. The receptacles 44 hold the rod 42 and the bag 16, but permit the bag to be removed from the support 14 and replaced, by lifting the rod out of the receptacles, sliding the loops 40 off of the rod and sliding a new bag (not shown) onto the rod. The rod 42 supporting the new bag can then be replaced with its ends in the U-shaped receptacles 44 for continued operation. Of course other ways of supporting the bag 16 may be employed without departing from the scope of the present invention. Preferably, the bag 16 is supported so that it can be readily removed and replaced. It is envisioned that structure, such as a second support and pump (not shown), could be used so that bags could be changed out without any interruption in operation of the apparatus 12.

At the lower end of the body 38, four nipples 46 extending down from the body are in fluid communication with the interior of the bag 16 for delivery of the fluent material F out of the bag and into the containers 10, as will be described more fully hereinafter. The number of nipples 46 is preferably the same as the number of containers 10 formed in each row. Naturally, the number of nipples and their precise arrangement can be varied as necessary for the particular manufacturing operation. The nipples 46 are generally elongate tubes which are integral with the body 38. The nipples 46 may be formed separately from the body 38 and attached in a suitable manner, such as by welding, adhesive or mechanical fastener(s) to achieve integration with the bag material which forms the body. However in the preferred embodiment, the nipples 46 are formed of the same piece of material as the body 38 of the bag 16. As initially formed, the lower ends of the nipples 46 are closed (as shown in FIG. 3) to seal the interior of the bag 16 to hold the fluent material F in the bag. In manufacturing operation, the ends are cut or otherwise made to have outlets to allow the fluent material F to flow out of the bag 16. Preferably, the nipples 46 are tubular with no internal structure. However, it is envisioned that the nipples could be equipped with internal valves or re-expansion devices (not shown) without departing from the scope of the present invention.

The bag 16 can be formed in any suitable fashion. A typical way of forming the bag 16 is to provide two webs of material which are brought together and cut to shape by a die (not shown) to form an enclosure. At the same time the webs are cut to shape, adjacent the peripheral edges of the bag are welded together in the die, such as by a solvent or RF welding. The adjacent edges could also be heat sealed, for example. As one alternative, a single web of polymeric material could be folded over against itself to form the enclosure. The folded web could be cut and sealed in a similar way as for the bag formed from two webs. Adjacent peripheral edges may be left unattached along a portion of the bag 16 to provide an opening for filling the bag with fluent material.

Figure 4:
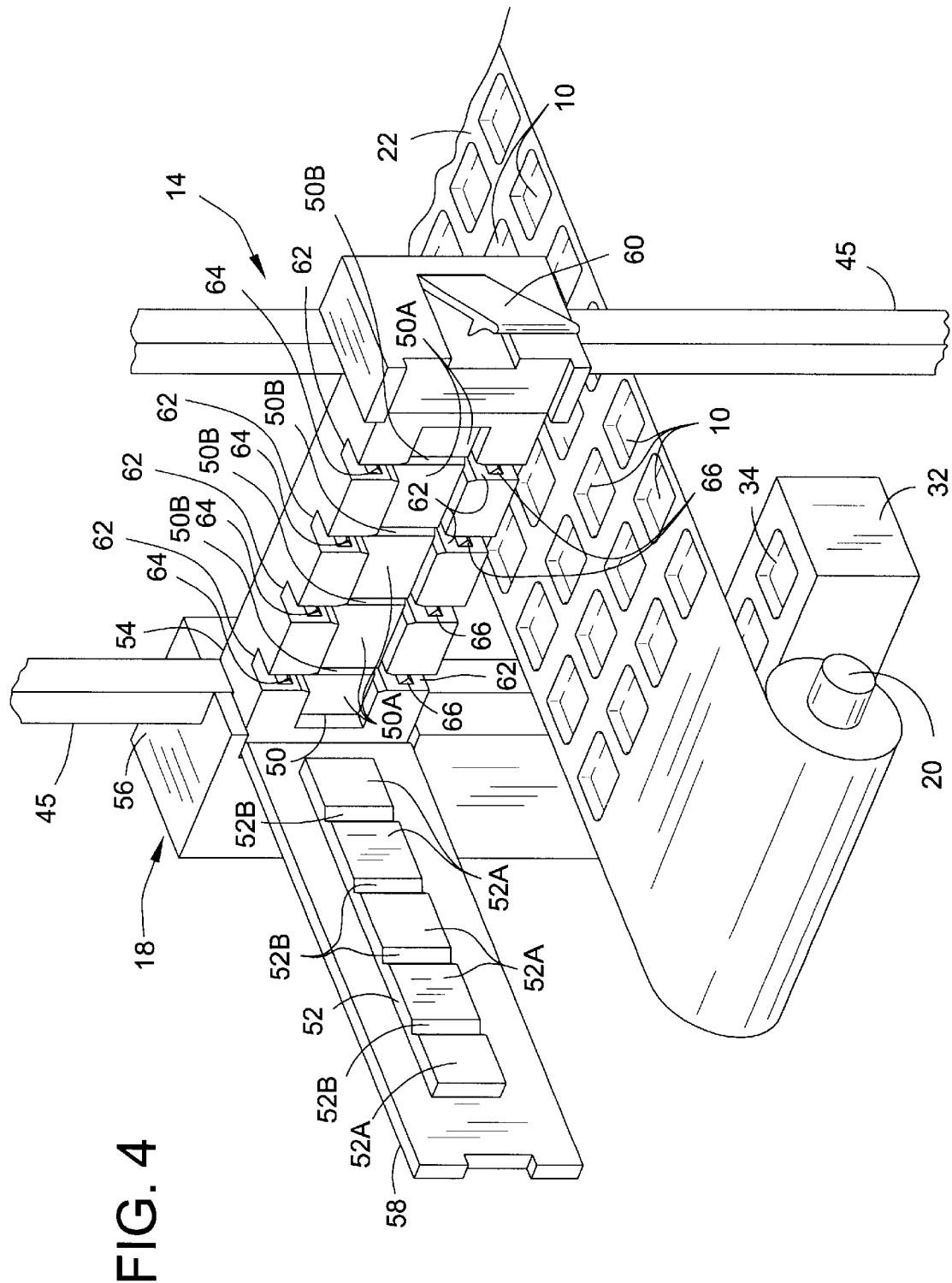
FIG. 4 is an enlarged perspective of the apparatus showing a pump thereof without the bag and open in preparation for receiving the bag nipples.
Figure 5:
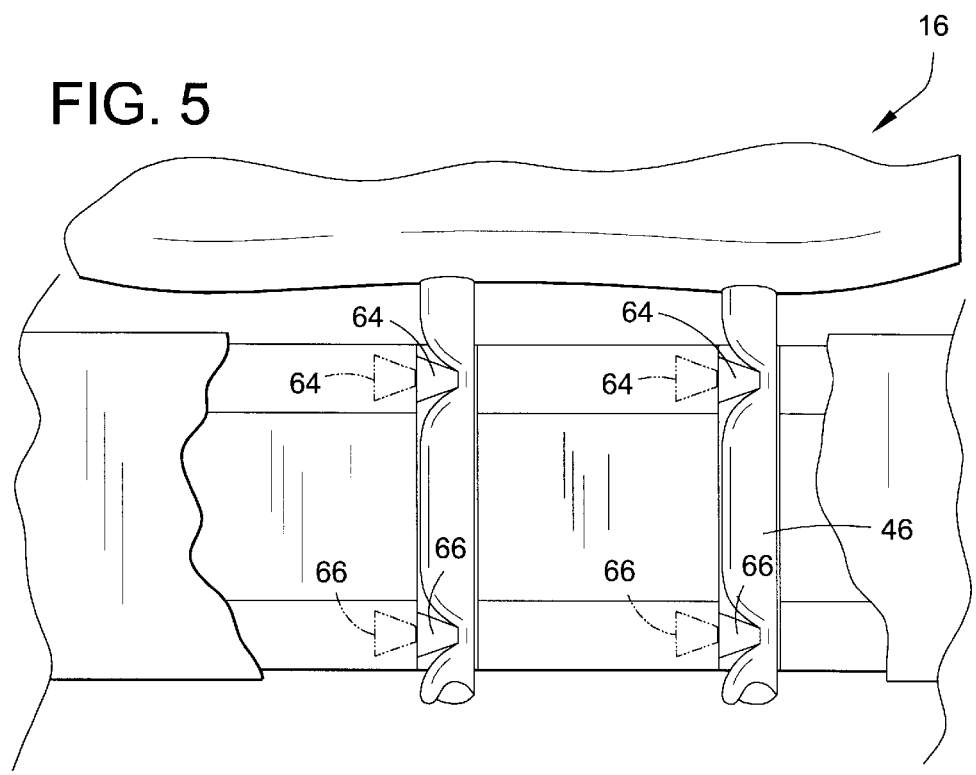
FIG. 5 is a enlarged, fragmentary elevation taken from the vantage indicated by line 5—5 of FIG. 1 with parts broken away to illustrate the reception of nipples in the pump.

The nipples 46 are received through the pump 18 which acts on the nipples as by deforming the nipples to produce a metered flow of the fluent material F out of the bag 16. The pump 18 is mounted on the support 14 which also holds the bag 16 and extends transversely over the web 22. The pump 18 illustrated in FIGS. 1, 4 and 5 is a shuttle pump, which includes a shuffle 50 and an anvil 52. The shuttle is mounted on a stationary crosspiece 54 for sliding movement relative to the crosspiece and anvil 52 in a direction transverse to the web 22. A housing 56 at the left end of the crosspiece 54 encloses a shuttle actuation mechanism (not shown). A door 58 hingedly attached to the crosspiece 54 carries the anvil 52. The door can be opened as shown in FIG. 4 to facilitate reception of the nipples 46 in the pump 18, and locked with a latch 60 in a closed position for operation, as will be more fully described. Referring to FIG. 4, both the shuttle 50 and the anvil 52 are shaped to have five flat plateaus (50A, 52A) separated by four valleys (50B, 52B). Except when the pump 18 is actuated to deliver fluent material F, the plateaus 50A, 52A and valleys 50B, 52B of the shuttle 50 and the anvil 52 are in substantial registration when the door 58 is closed. The nipples 46 are received in the aligned valleys 50B, 52B such that each nipple is surrounded by the shuttle 50 and anvil 52. In the illustrated embodiments, the nipples 46 are the portions or regions of the bag 16 which are received in or acted upon by the pump 18. Two of the nipples 46 are illustrated in FIG. 5 as received in the valleys 50B, 52B, but only the valleys 50B may be seen because the door 58 and anvil 52 have been broken away. The crosspiece 54 is further formed with upper and lower aligned slots 62 which are vertically aligned with the valleys of the anvil 52. The nipples 46 pass through these slots 62 upon entering and exiting the pump 18. An upper pincher 64 and a lower pincher 66 located on one side of each slot 62 are mounted for extension and retraction from the crosspiece 54 across the slot (i.e., transverse to the web 22). The pinchers 64, 66 extend to pinch the nipples off, closing the nipples from fluid flow past the points where the nipples are pinched. The pinchers 64, 66 are separately actuated from the shuttle 50 and the upper pinchers are separately actuated from the lower pinchers, as will be described more fully hereinafter, to facilitate accurate dispensing of the fluent material F. A pump of the same general type is disclosed in U.S. Pat. No. 5,151,019, the disclosure of which is incorporated herein by reference.

Figure 6:
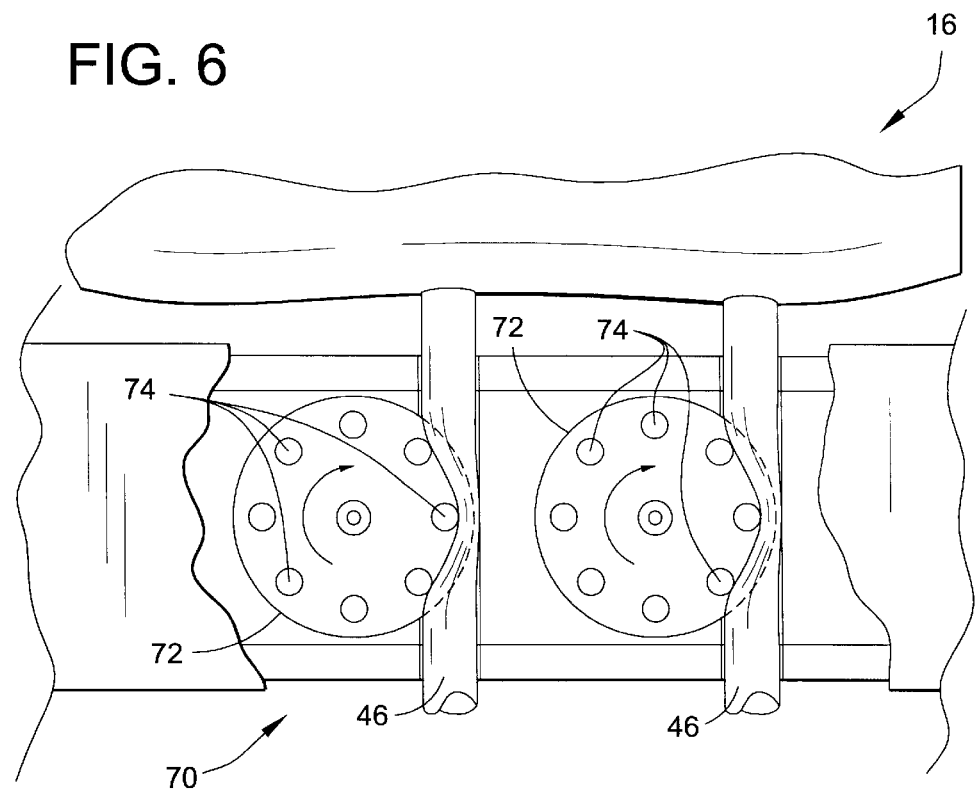
FIG. 6 is a fragmentary, schematic elevation similar to FIG. 5 but showing another pump capable of delivering fluent material at different rates or in different amounts from the different nipples.

Although the shuttle pump 18 is believed to be adequate for use in the apparatus 12, other forms of pumps may be used without departing from the scope of the present invention. The present pump 18 may be so configured that the upper pinchers 64 in each slot are separately actuated from each other, as are the lower pinchers 66 so that fluid flow from each nipple 46 is independent of that of the other nipples. However, the pump or fluid flow control device may take on other, entirely different forms. For instance and without limitation, a peristaltic pump (generally indicated at 70) of the type shown in FIG. 6 could be used. The peristaltic pump 70 has a pump wheel 72 for each nipple 46 including pegs 74 which extend perpendicularly outward from the wheel near its periphery. Each wheel 72 is mounted for rotation, such as by an individual electric motor (not shown) so that the pegs 74 are brought into sequential engagement with the nipple 46 to force fluent material F out of the nipple. By stopping the wheel 72 as shown in FIG. 6, the nipple would be pinched off so that no fluent material would exit the bag 16. The wheels 72 could be run at different times and at different speeds to vary the sequence of fluid delivery and/or the flow rate between nipples 46. The angular spacing between adjacent pegs 74 on the wheels 72 could be different so that the amount of fluent material dispensed for the same angular rotation of the wheels is different. It is to be understood that FIG. 6 is but one example of an alternate pump which could be used.

Figure 7:
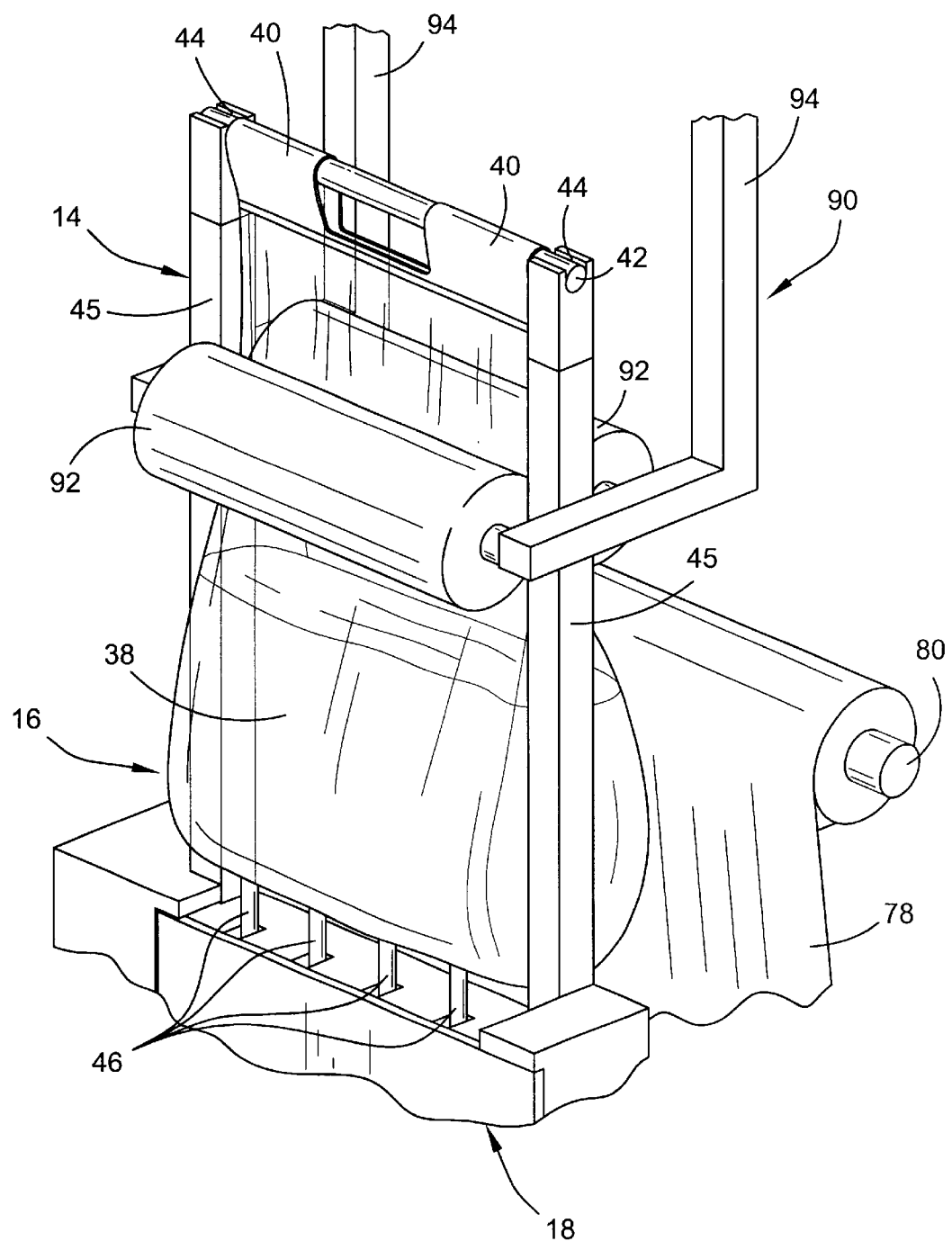
FIG. 7 is an enlarged, fragmentary view of apparatus similar to that shown in FIG. 1 but including a bag squeezing mechanism to force fluent material toward the nipples and pump.

It will be necessary for viscous fluent material F to provide a mover in addition to the pump 18 to cause the fluent material to flow for refilling the nipples 46 after a discharge by the pump. A second mover of this type is indicated generally by the reference numeral 90 in FIG. 7. The second mover is shown to comprise a pair of rollers 92 mounted on arms 94 and located on opposite sides of the bag 16. The rollers 92 are mounted for free rotation about their longitudinal axes, and can be separated to facilitate removal and replacement of the bag 16. The arms 94 are connected to a controlled actuator (not shown) which is capable of indexing the arms down to gradually squeeze the bag 16 from top to bottom to empty the bag. The downward movement of the arms 94 to squeeze the body 38 of the bag 16 is used to force the fluent material F downwardly into the nipples 46. It is envisioned that the arms 94 could be indexed down after the pump 18 has discharged to assist in refilling the nipples 46 for the next discharge.

Figure 8:
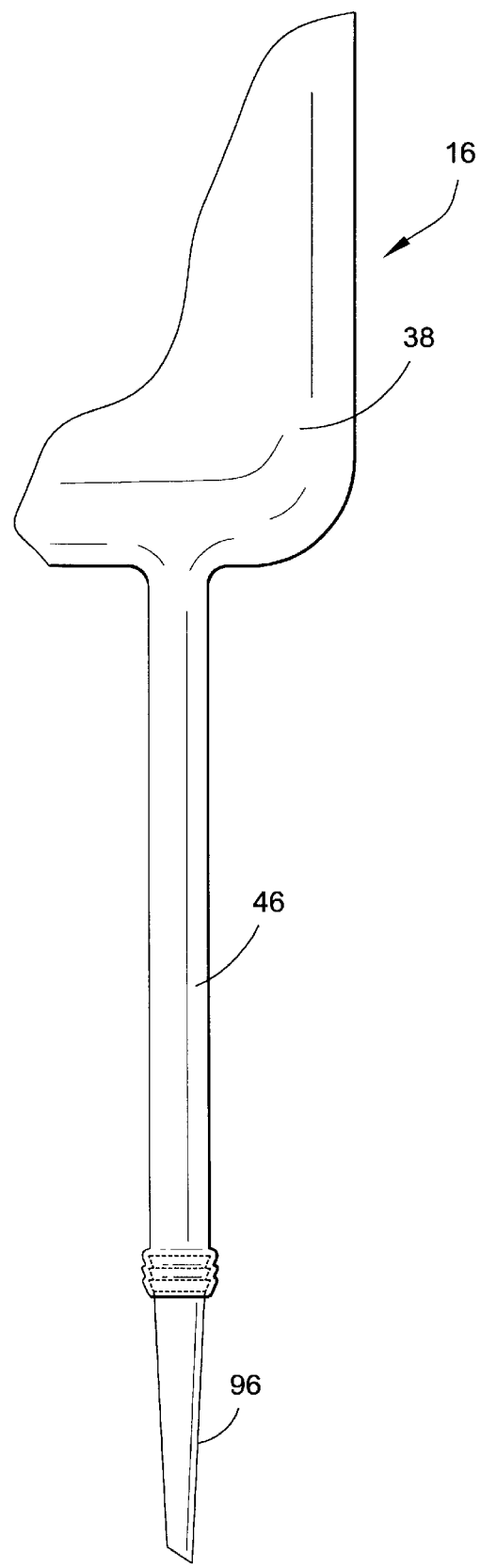
FIG. 8 is a fragmentary view of the flexible bag showing on of the nipples receiving a needle in its outlet.

As stated previously, the apparatus 12 has application where fluent material F is applied onto an article, or injected into an article. Referring to FIG. 8, the bag 16 may have a fitment, in this case in the form of an injection needle 96, attached to each nipple 46 (only one is shown). The needle 96 is formed of a suitably rigid material and sealingly attached in the outlet of the nipple 46. The needle 96 could be captured by an injection device (not shown) to move the needle down into the article before operation of the pump 18 to eject fluent material. Alternatively, the needle 96 could be held stationary and the articles moved upward into the needles. It is to be understood that other types of fitments (not shown) could be used without departing from the scope of the present invention. For instance a fitments which allow the nipple 46 to be attached to another nipple or tube (not shown), or which shape the fluent material F as it flows out of the nipple could be used. Moreover, the end of the nipple 46 could be formed to shape or control flow of the fluent material. Further, polymer material having different material characteristics (e.g., such as density and rigidity) could be integrally formed with the material of the bag 16 at the outlets for such purposes.

Downstream from the support 14 and the bag 16 is a mechanism for closing the containers 10 filled with fluent material F. As shown in FIG. 1, a web 78 from a roll of closure material held by a second feed roller 80 is fed downwardly under a second guide roller 82 toward and under the first guide roller 26 to the take-up roller 24. Thus, it may be seen that the take-up roller 24 collects both remnants of the container material web 22 and the closure material web 78. After passing under the second guide roller 82, the closure material web 78 is in face-to-face relation with the unformed material of the web 22 surrounding the open tops of the containers 10. The closure mechanism comprises a heat sealing device 84 capable of coming down against the closure material web 78 and sealing the closure material with the container material of the web 22 so that the open tops of all four containers 10 in the row are separately closed, sealing in the fluent material F in the containers. A punch 86 and a die 88 downstream from the closing mechanism are operable to move together to punch through the closure material web 78 and the container material web 22 to separate each container 10 (including its own closure) from the container material web and the closure material web. The remnants of the container material web 22 and the closure material web 78 remain in tact for movement to the take-up roller 24. The punch 86 has four rectangular projections 86A (only one is shown) and the die has four holes 88A (only one is shown), one for each container 10 in the row. The projections 86A are received in the holes 88A when the punch 86 and die 88 are activated to cut through the closure material web 78 and container material web 22. The containers 10 drop down through the die 88 to the belt conveyor 28 for transport to the box B.

Having described the construction of the apparatus 12 and the flexible bag 16, the operation of the apparatus will be described. As an initial matter, flexible bags such as bag 16 will have been formed, filled with the fluent material F (e.g., honey) to be packaged in the containers 10, and sealed at a remote location, such as a processing plant. The method of the present invention is not limited to remote forming, filling and sealing of the bags, but is suited for this type of manufacturing arrangement. The bags 16 are formed, filled with the fluent material F and sealed at the processing plant, and then placed in a suitable transport to the manufacturing facility where the final packaging is to be done. The bags can be formed, filled and sealed in an aseptic form/fill/seal machine, or could be formed under non-aseptic conditions and then sterilized along with the fluent material after the bag is filled. As previously stated, it is not necessary that the bags 16 be aseptic where the conditions do not require it, but bags of this type are particularly adapted for use where aseptic conditions are needed, such as in food or medicine packaging.

Once at the final packaging site, one of the bags 16 is loaded into the apparatus 12 by lifting at least one end of the rod 42 out of the U-shaped receptacles 44 and sliding the bag onto the rod so that the rod is received through both of the loops 40 at the top of the bag. The rod 42 is then replaced on the support 14 with its ends in the receptacles 44. The door 58 of the pump 18 is open, substantially as shown in FIG. 4, and the nipples 46 are positioned in the upper and lower slots of the crosspiece 54 in registration with the valleys of the shuttle 50. The door 58 is then closed and the latch locked so that the nipples 46 are received in both the valleys of the shuttle 50 and the valleys of the anvil 52 (FIG. 5). The first feed roller 20 will have had a roll of container material mounted thereon and the web 22 of container material is threaded from the roll around the first guide roller 26 and attached to the take-up roller 24. Similarly, the roll of closure material is received on the second feed roller 80 and the web 78 of closure material is threaded around the second guide roller 82 to the first guide roller 26 and then attached to the take-up roller 24. The apparatus 12 is ready for production operation to form, fill and seal containers 10.

Figure 2:
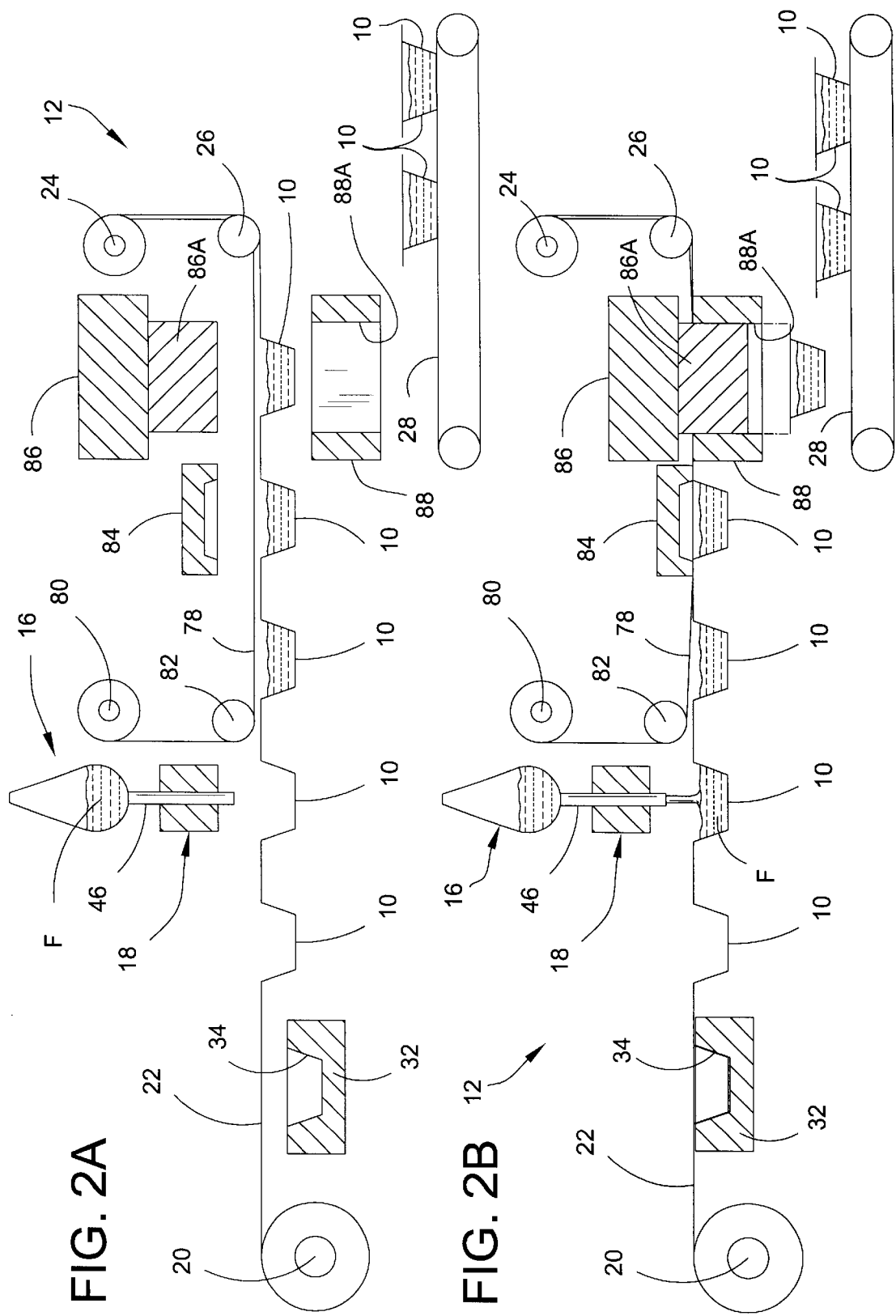
FIG. 2A is a diagrammatic flow of the apparatus illustrating its operation in a forward feed mode.
FIG. 2B is a diagrammatic flow of the apparatus illustrating its operation in a fill, seal and separate mode.

Referring now to FIGS. 2A and 2B, the sequence of operation of the apparatus 12 is described. As illustrated in FIG. 2A, the first and second feed rollers 20, 80 and the take-up roller 24 are actuated (such as by one or more electric motors, not shown) to index the container material web 22 and the closure material web 78 forward one increment. The increment in the illustrated embodiment corresponds to the dimension of one containers 10 to be formed which is parallel to the lengthwise extent of the web 22 plus a predetermined amount corresponding to the spacing between adjacent rows of containers. The first and second feed rollers 20, 80 and the take-up roller 24 are halted to stop the forward advance of the container material web 22 and closure material web 78 for a dwell. The form and die 32 are actuated to engage the container material web 22 to form a row of containers 10 still attached to the container material web. The index and form steps are initially repeated until a row of formed containers 10 underlies the nipples 46 when the container material web 22 dwells.

This time the shuttle pump 18 is actuated to deliver a preselected charge of fluent material F to each of the four containers 10 in the row. After the bag 16 was installed in the apparatus 12 as described above, the lower pinchers 66 were extended (to the position shown in solid lines in FIG. 5) to pinch the nipples 46 near, but spaced somewhat above their lower ends against the crosspiece 54 in the slots 62. The ends of the nipples 46 were cut open to form outlets for delivering fluent material F. The upper pinchers 64 are then extended to pinch off the nipples 46 near their upper ends (the position shown in solid lines in FIG. 5) and define a charge of fluent material F located in each nipple between the upper pincher and the lower pincher 66. After the first row of containers 10 stops under the nipples 46, the pump 18 is activated to retract the lower pinchers 66 into the crosspiece 54 (the position shown in phantom lines in FIG. 5) and slide the shuttle 50 in a direction transverse to the container material web 22. Retraction of the lower pinchers 66 allows fluent material to flow out of the nipples 46 under the force of gravity. However, the pump 18 also deforms the nipples 46 by squeezing to make certain the charges of fluent material F between the pinchers 64, 66 is delivered out of the nipples. The sliding of the shuttle 50 moves the valleys 50B substantially out of registration with the nipples 46 and moves the plateaus 50 A substantially into registration with the valleys 52B of the anvil 52, squeezing the nipples and forcing the fluent material out of the outlets at the lower ends and into the containers 10.

The shuttle 50 moves back to its original position and the lower pinchers 66 are extended to close off the nipples 46 against further flow of fluent material F. The upper pinchers 64 are retracted and more fluent material moves down into the nipple, re-filling it. The upper pinchers 64 are then closed to pinch off the upper ends of the nipples and define new charges of the same volume as the previous charges and the cycle is repeated. The re-filling of the nipples 46 preferably occurs in the time it takes for the container material web 22 to be advanced forward one row. It will be appreciated that the pump 18 operates at the same time a new row of containers 10 is being formed during a dwell of the container material web 22. It is envisioned that additional rollers or other devices (not shown) to hold the web 22 from vibrating under the bag 16 as a result of the act of forming of the containers could be used as needed.

The filled containers 10 in the row move downstream with each feed of the container material web 22, eventually passing under the closure material web 78. The open tops of the containers 10 are covered by the closure material web 78 when the containers reach the heat sealing device 84. During the dwell, the heat sealing device 84 moves down against the closure material web 78 and seals the closure material to the unformed material of the container material web 22 surrounding the open upper ends of the containers 10. The fluent material F is now sealed inside the containers 10. The containers continue to be attached to the container material web 22 and are now also attached to the closure material web 78. The attachment is illustrated by the dashed lines on the closure material web 78.

At a subsequent dwell, the row of sealed containers 10 is aligned with the punch 86 and die 88 which are actuated to cut through the closure material web 78 and container material web 22 to separate the sealed containers from the webs. The containers 10 fall through the holes 88A in the die 88 onto the belt conveyor 28. The belt conveyor may run continuously to carry the loose containers to the box B. In the illustrated embodiment, the containers 10 simply fall into the box B (i.e., are tumble packed). It will be understood that other final packing arrangements within the knowledge of those of ordinary skill could be used. The remnants of the container material web 22 and the closure material web 78 continue on around the second guide roller 82 to the take-up roller 24.

When the bag 16 is exhausted of fluent material F, it may be removed and replaced with a new bag. The exhausted bag 16 can be disposed. It will be appreciated that none of the machinery of the apparatus 12 comes into contact with the fluent material F in the packaging operation. The bags 16 themselves, rather than the fluent material F, are acted upon by the pump 18 to cause the containers 10 to be filled so that the bags may serve as the aseptic surfaces in the apparatus 12. Of course, the container material and the closure material must be aseptic when conditions require it, but in every circumstance it will be easier to keep the parts of the apparatus 12 which handle this material clean. It will not be necessary in the ordinary course to clean the fluent material from the apparatus 12.

In view of the above, it will be seen that the several objects of the invention are achieved and other advantageous results attained.

When introducing elements of the present invention or the preferred embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above without departing from the scope of the invention, it is intended that all matter contained in the above description and shown in the accompanying drawings shall be interpreted as illustrative and not in a limiting sense.

What is claimed is:

1. A method of automatically filling receiving members with a fluent material for mass production of filled receiving members, the method comprising the steps of:
   providing an array of receiving members adapted to receive fluent material;
   providing a flexible bag containing fluent material; and
   metering a charge of fluent material from the bag to plural ones of the receiving members at the same time.

2. A method as set forth in claim 1 further comprising replacing the flexible bag with a new flexible bag filled with the fluent material.

3. A method as set forth in claim 2 further comprising the step of disposing of the replaced flexible bag.

4. A method as set forth in claim 3 wherein the step of providing a flexible bag comprises providing a flexible bag having multiple outlets for dispensing the fluent material.

5. A method as set forth in claim 4 wherein the step of providing a flexible bag comprises providing flexible bag having integral nipples, the outlets being associated with the nipples, and wherein the step of metering flowable material comprises squeezing and releasing at least multiple ones of the nipples to eject the charge of flowable material from the outlet.

6. A method as set forth in claim 5 wherein the step of providing a flexible bag further comprises forming fitments in the outlets of the nipples.

7. A method as set forth in claim 6 wherein the step of forming fitments comprises connecting injection devices to the nipples in the outlets.

8. A method as set forth in claim 5 wherein the step of providing a flexible bag comprises forming the nipples as one piece with the flexible bag.

9. A method as set forth in claim 5 further comprising squeezing the bag to force fluent material into the nipples.

10. A method as set forth in claim 1 wherein the step of metering a charge of fluent material to plural ones of the receiving members at the same time comprises metering fluent material to the receiving members in at least one of different rates and different amounts.

11. A method as set forth in claim 1 wherein the step of metering a charge of fluent material comprises dispensing a fixed amount of fluent material to the receiving members.

12. A method as set forth in claim 1 wherein the step of metering a charge of fluent material comprises injecting fluent material into the receiving members.

13. A method as set forth in claim 1 further comprising establishing relative motion between the array of receiving members and the bag whereby in the reference frame of the bag, the array of receiving members pass the bag.

14. A method as set forth in claim 1 wherein the step of providing an array of receiving members comprises forming containers which receive the fluent material.

15. A method as set forth in claim 14 further comprising closing the containers to hold the fluent material in the containers.

16. A method of dispensing a fluent material to articles which receive the fluent material in a manufacturing operation comprising the steps of:
   selectively dispensing fluent material to plural ones of the articles at the same time by deforming a flexible reservoir to eject fluent material therefrom; and replacing the flexible reservoir with another flexible reservoir upon substantial depletion of fluent material from the reservoir as a result of the dispensing step, for continued dispensing of the fluent material.

17. A method as set forth in claim 16 further comprising the steps of:
   forming the flexible reservoir;
   filling the flexible reservoir with the fluent material;
   sealing the reservoir.

18. A method as set forth in claim 17 wherein the step of filling the flexible reservoir is carried out in an aseptic environment.

19. A method as set forth in claim 17 further comprising sterilizing the reservoir and fluent material after said filling step.

20. A method as set forth in claim 17 wherein subsequent to the sealing step and prior to the step of selectively dispensing fluent material, the method further comprises transporting the sealed reservoir to a different manufacturing facility.

21. A method as set forth in claim 17 further comprising forming multiple outlets in the sealed reservoir for dispensing fluent material and wherein the step of dispensing includes independently deforming the flexible reservoir in regions adjacent the outlets.

22. A method as set forth in claim 21 further comprising squeezing the reservoir to force fluent material toward the regions adjacent the outlets.

23. A method as set forth in claim 16 wherein the step of dispensing fluent material further comprises dispensing fluent material to the articles in at least one of different rates and different quantities.

24. A method as set forth in claim 16 wherein the step of dispensing comprises metering a fixed amount of fluent material to the articles.

25. A method as set forth in claim 16 further comprising the steps of obtaining relative movement between the flexible reservoir of the fluent material and the articles to which the fluent material is to be dispensed whereby with respect to the reference frame of the flexible reservoir, the articles pass under the reservoir.

26. A method of automatically filling receiving members with a fluent material for mass production of filled receiving members, the method comprising the steps of:
   providing an array of receiving members adapted to receive fluent material;
   providing a flexible bag having multiple outlets and containing fluent material;
   metering a charge of fluent material from the bag to plural ones of the receiving members.

27. A method as set forth in claim 26 wherein the step of metering a charge of fluent material to plural ones of the receiving members comprises metering fluent material through one of the multiple outlets in at least one of a different rate and a different amount from another of the multiple outlets.

28. A method as set forth in claim 26 wherein the step of metering a charge of fluent material comprises dispensing a fixed amount of fluent material to the receiving members.

29. A method as set forth in claim 26 wherein the metering step comprises metering fluent material through more than one of the multiple outlets simultaneously.

* * * * *